Dec. 14, 1954     L. TIGERMAN     2,696,696
APPLICATOR FOR WEED-KILLING LIQUID
Filed Dec. 19, 1951     2 Sheets-Sheet 1
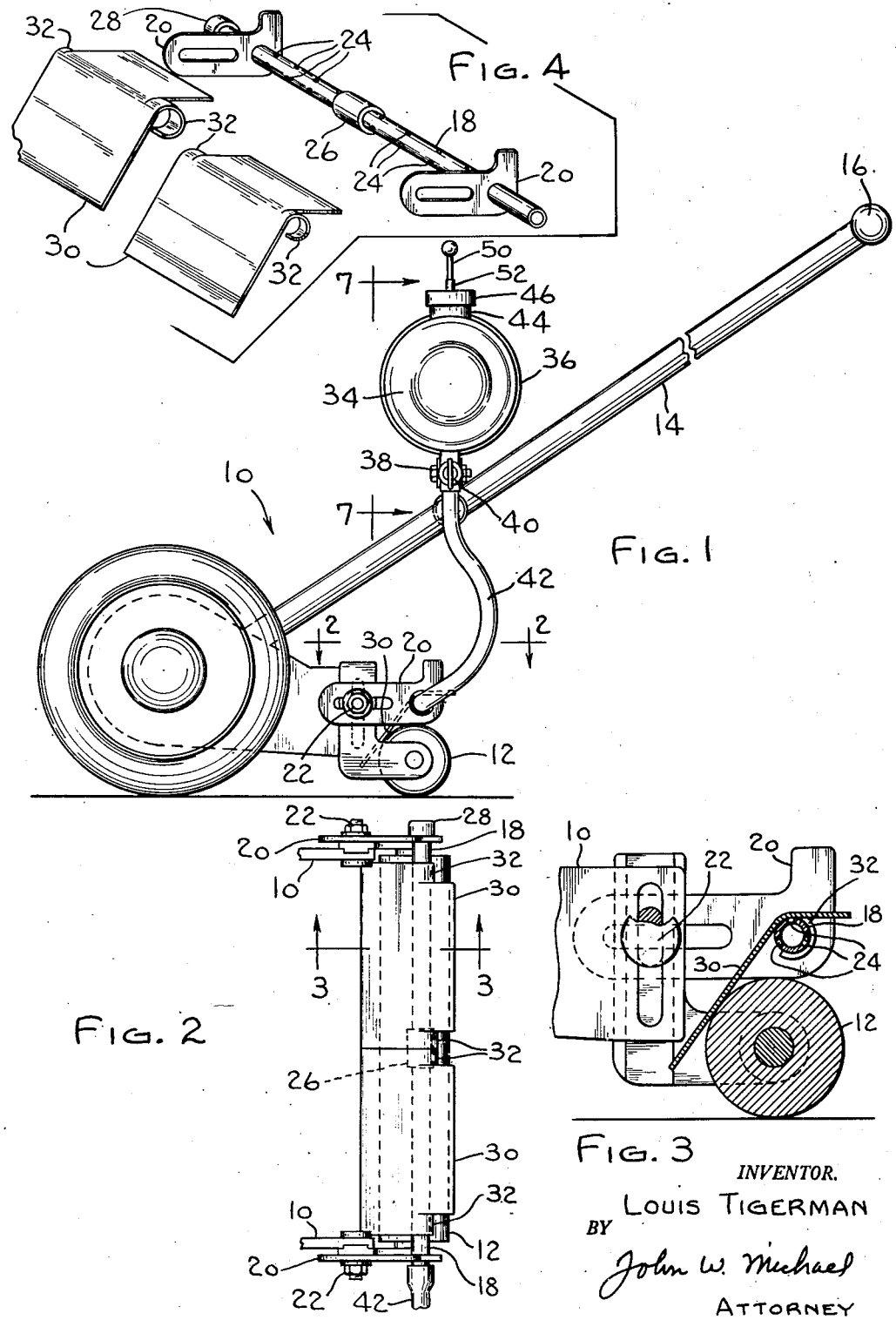
INVENTOR.
LOUIS TIGERMAN
BY
John W. Michael
ATTORNEY

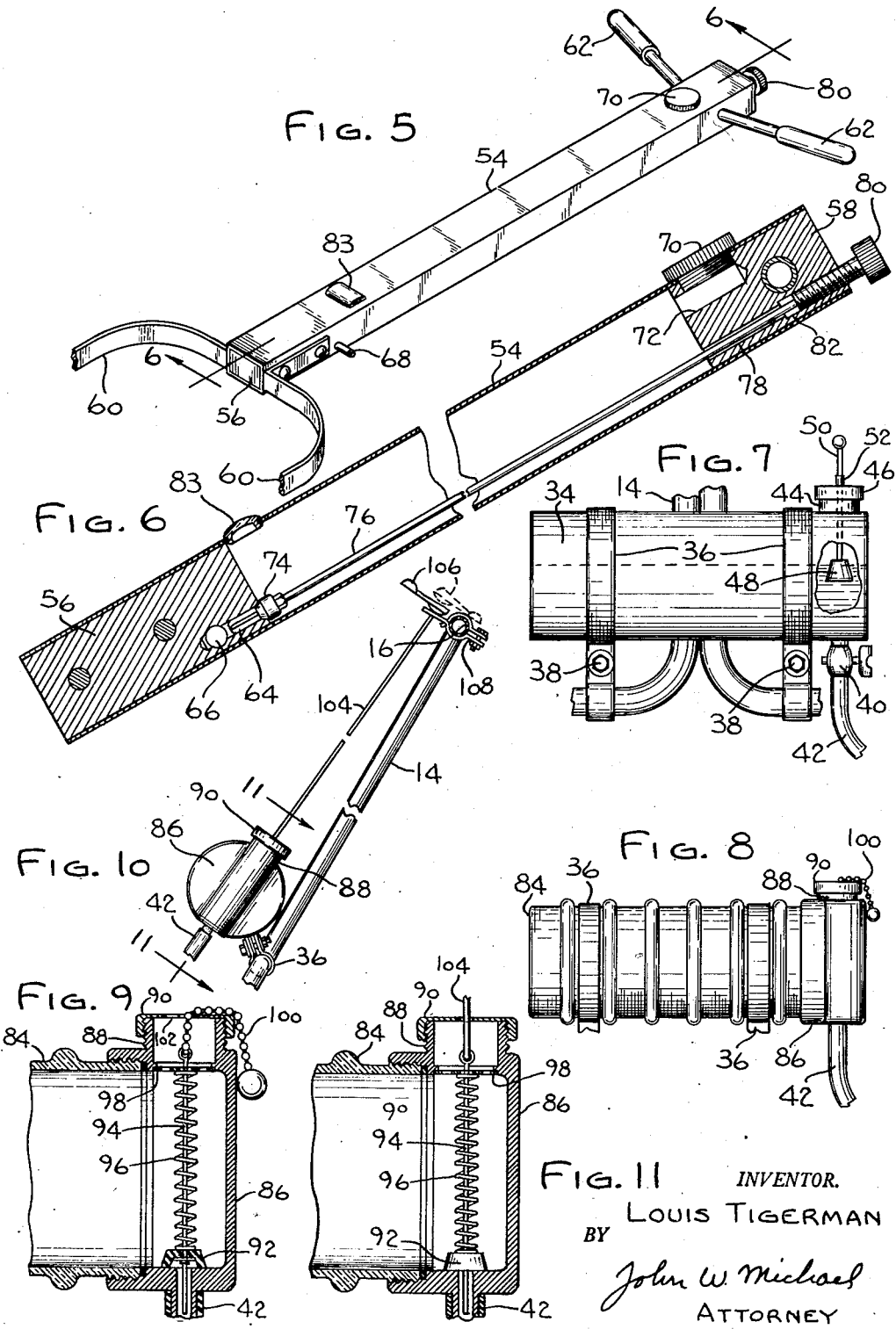

United States Patent Office 2,696,696
Patented Dec. 14, 1954

2,696,696

APPLICATOR FOR WEED-KILLING LIQUID

Louis Tigerman, Milwaukee, Wis., assignor to Tigerman Co. Inc., Milwaukee, Wis., a corporation of Wisconsin Application December 19, 1951, Serial No. 262,465

3 Claims. (Cl. 47—1)

This invention relates to improvements in applicators for liquid for killing weeds or fertilizing plant life.

Many of the well-known liquid weed exterminators perform more efficiently when applied to the leaf of the weed by contact between the leaf and liquid distributor. Such "direct" application prevents the exterminator from reaching the leaves of plants, the destruction of which is not desired. It is also more economical.

Attempts have been made to provide applicators which deposit the weed-killing liquid on the leaf of the weed directly from a distributor but so far none have been made available which provide a regulated continuous supply of the weed-killing liquid and distribution means which will not clog nor have the flow of liquid disturbed as such means contacts the leaves of the weeds and other plants or clippings therefrom.

One of the objects of this invention, therefore, is to provide an applicator for distributing weed-killing liquid which obviates the foregoing deficiencies.

Another object of this invention is to provide an applicator for liquid for killing weeds or fertilizing plant life which when attached to a lawn-mower will cooperate therewith to have the clippings of grass protect the liquid from undue evaporation.

Still another object of this invention is to provide an applicator for liquid for killing weeds or fertilizing plant life which is easily and inexpensively manufactured and readily attached to lawn-mowers or other roller-moving devices without requiring special skill or special tools.

These objects are attained by placing a distribution tube with small spaced outlets above a roller adapted to contact the weeds and connecting such tube to a supply tank by means of a regulating valve. The weed-killing liquid drops from the outlets onto the roller at a controlled rate sufficient to keep the surface of the roller continually wet with a film of the weed-killing liquid. As the roller is moved along the surface of the ground the liquid is brought into direct contact with the leaves of the weeds.

Such applicator may be attached to any device provided with a ground-engaging roller. For example, the applicator may be attached to a lawn-mower. In such instance it has been found preferable to use a shield for the distribution tube to prevent cuttings lodging on such tube and affecting the flow from the outlets. The shield may also rest on the roller and thus prevent the roller from becoming coated with cuttings. When the applicator is so mounted on a lawn-mower the grass clippings fly over the roller and come to rest on the surface of the lawn to which the liquid has been applied to provide a cover protecting such liquid from the direct rays of the sun and preventing undue evaporation. This increases the efficiency of the weed-killer.

In order to have a sufficient continuous supply of the weed-killing liquid a large supply tank is mounted on or formed by the handle by which the roller is motivated. The adjusting valve controls the amount or head of liquid in the distribution tube and thus determines the flow from the outlets. The outlets are small enough so that with the valve only slightly opened the liquid will flow along the entire length of the tube and will drop at an even rate from all the outlets.

The novel features which are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings in which:

Fig. 1 is a view in side elevation of an applicator for weed-killing liquid embodying the present invention and mounted on a lawn-mower of customary design;

Fig. 2 is a top plan view of such applicator taken from line 2—2 of Fig. 1;

Fig. 3 is an enlarged sectional view taken on line 3—3 of Fig. 2;

Fig. 4 is an enlarged exploded view in perspective of the liquid-distributing tube and shields comprising parts of the applicator;

Fig. 5 is a perspective view of a modified supply tank for the applicator;

Fig. 6 is an enlarged fragmentary longitudinal sectional view of the tank taken on line 6—6 of Fig. 5;

Fig. 7 is a view in front elevation taken from line 7—7 of Fig. 1;

Fig. 8 is a view in front elevation of another modified supply tank;

Fig. 9 is a fragmentary enlarged sectional view of the control valve used in the tank shown in Fig. 8;

Fig. 10 is a view in side elevation of still another modified supply tank and control valve therefor; and Fig. 11 is an enlarged fragmentary sectional view taken on line 11—11 of Figure 10.

For purposes of illustration, the applicator herein described is shown supported on a hand-operated lawn-mower 10 heaving a ground-engaging roller 12 and controlled by a handle 14 with hand grips 16. However, the applicator may be mounted on any support which is capable of being moved along the surface of a lawn. It is preferable, but not necessary, that such support include a ground-engaging roller. The support should also have a controlling handle.

The principal element of the applicator is a distributing tube 18 which is carried by mounting brackets 20 so as to directly overlie the roller 12. In this embodiment the brackets 20 are fastened to the bolts and nuts 22 which adjustably mount the roller 12 to the body of the lawn-mower and have openings for holding the tube. The brackets may also be used for mounting a grass clippings catcher. The distributing tube 18 has a plurality of small spaced outlets 24 arranged in rows extending longitudinally along the tube. The outlets are approximately one sixty-fourth of an inch in diameter and drilled to insure smooth edges at both inner and outer surfaces of the tube. A feature of this invention is the use of three rows of outlets angularly equally spaced about the circumference of the tube. This feature performs two functions. First, in assembling the tube no care need be taken to have a particular row of outlets positioned at the bottom. The tube need not be rigidly mounted to maintain such row at the bottom. No matter what angular position the tube assumes there will always be a row or rows of outlets well below the center of the tube. This can be seen by referring to Fig. 3 where one row of outlets is on top with two rows of outlets below the center of the tube. If the tube be rotated either way from this position one row of outlets will move nearer to the bottom of the tube. Second, at least one row of outlets will always be above the center line of the tube to insure that atmospheric pressure will always be present within the tube and thus insure even flow of liquid from the lower outlets. The outlets are small enough so that even with a very low rate of flow of the liquid into one end of the tube such liquid will spread over the entire length of the tube and droplets thereof will fall from all the outlets along the lowest row. The rate of flow from the outlets is controlled by the head of the liquid within the tube from slow drops to steady streams. When the flow of liquid to the tube is great enough to keep the tube completely full the liquid will exit from all rows of outlets and the rate of flow will be controlled by the head of liquid in the supply tank. However, in most operations the control will be by the head of liquid in the tube. The advantages of this is that such head will not materially change as the liquid in the supply tank is used up changing the head therein. To obtain manufacturing economy and insure against corrosion the tube 18 may be made in sections of standardized length of copper with each end threaded. Multiples of such sections may be coupled by a coupling or couplings 26 to provide the length suitable for the particular size of the lawn-mower or other support to which the applicator is to be attached. One end of the tube 18 is closed by a cap 28 which may be a standard metal pipe cap or a cap of synthetic elastic material frictionally fitted on such end. The other end of the tube 18 is connected to the source of supply.

As previously pointed out the tube 18 is positioned over the roller 12. Hence the weed-killing liquid will fall onto the surface of such roller. The liquid will wet the roller and form a film over its entire surface. As the lawn-mower or other supporting device is moved over the lawn the film of weed-killing liquid on the roller 12 will be brought into direct contact with the broad leaves of the weeds. It requires only a minute amount of the weed-killing liquid of the type causing destructive growth of the weed to be effective. This method of bringing the film of liquid directly to the broad leaf of the weed not only conserves the use of the liquid but also prevents such liquid from coming in contact wtih broad leaves of desirable plants by wind drift or other means. Another advantage of this method of distributing such liquid is that there will be no clogging of the outlet openings in the distributing tube because there is no contact between such outlets and the surface of the lawn.

When the applicator is used in combination with a lawn-mower, the distributing tube 18 is positioned behind the grass cutter and close enough thereto so that the clippings thrown rearwardly by the cutter will fly over the top of the tube 18 and fall to the surface of the lawn after the roller 12 has applied the weed-killing liquid thereto. These clippings thus form a protective cover on the liquid-contacted surface which prevents undue evaporation of such liquid and increases its effectiveneess.

A small amount of grass clippings will not be thrown clear of the distributing tube 18. Such clippings have an opportunity to and in some instances do light on the surface of the tube 18 and because of the dampness of the clippings or dampness of the surface of the tube such clippings will stick to such tube and form a coating thereon. This coating does not clog up the outlets as the liquid will still flow through such coating and drop from the bottom thereof. However, such coating does have a tendency to make the rate of the flow of the liquid irregular. To prevent such coating from being formed, a shield 30 is carried by and rests on the tube 18 and extends therefrom to the roller 12. The shield is also made in sections of standardized length and one section is used for each section of the tube 18. The shield is secured to the tube 18 by strips 32 bent from the body of the shield about such tube. The lower leg of the shield rests against that quadrant of the roller 12 which faces the cutter and the upper leg covers the tube 18. Thus the shield prevents clippings from falling on the tube 18 or on the roller 12. In addition, the contact between the shield and the roller wipes the surface of the roller and keeps it clean and spreads the liquid along the roller, thus enhancing the efficient formation of the film of weed-killing liquid over the entire surface of the roller.

It has been heretofore pointed out that the distributing tube 18 is positioned so that the weed-killing liquid falls onto the roller 12 and is brought by such roller into contact with the weeds. If such tube were positioned so that the liquid fell directly to the surface of the lawn, it would still be effective to kill weeds upon which it fell. A greater volume of the liquid would be required to insure a thorough distribution thereof over the entire width of the cut made by the lawn-mower. This cuts down the efficiency of the applicator. However, the tube 18 can still be positioned between the cutter and the place where the majority of clippings normally fall after being thrown rearwardly by the cutter. Hence, the cover of clippings would be as effective to lessen evaporation as in the first case where the liquid is distributed by the roller.

In order to continuously supply the tube 18 with the weed-killing liquid a supply tank 34 is mounted by straps 36 to the handle 14. The straps 36 are preferably made of metal rigid enough to hold the tank in proper place and yet sufficiently bendable to be formed by hand to fit around the tank and around the variously shaped types of handles. Bolts and nuts 38 fit through selected holes in the straps to tighten and hold such straps. The tank 34 has a bottom outlet into which is threaded a manually adjustable valve or cock 40 by which the flow of liquid from the tank may be completely stopped or adjusted to the desired rate. A flexible tube 42 of plastic or other inert material is fitted over the nipple of the valve 30 and over the open end of the tube 18 to form a connection between tube and tank. The tube 42 is long enough to provide free movement for the handle 14 relative to the tube 18 during normal operation of the lawn-mower. The tank 34 has a filler neck 44 closed by a removable cap 46. This cap may carry a visible supply gauge consisting of a cork float 48 within the tank secured to the lower end of a rod 50 which projects upwardly through a guide 52 to the outside of the cap. When the top of the rod nears the cap it indicates that the tank is nearly empty.

Depending upon the concentration of weeds and the speed at which the lawn-mower is being propelled, the user adjusts the valve 40 so that the tube 18 is continuously supplied with the weed-killing liquid at a rate sufficient to maintain a desired head of liquid in the tube. This head should be enough to keep the roller 12 continuously supplied with a film of the liquid. It requires visible inspection from time to time to see that the roller is continuously wet and the flow adjusted in accordance with such inspection. With a small amount of experience the user can easily regulate flow of liquid to obtain the most efficient distribution.

The applicator for weed-killing liquid herein described has been successfully used with the weed-killer known as 2,4 dichlorophenoxyacetic acid or its salt and ester derivatives. It is commonly known in the trade as 2,4 D. However, this applicator will effectively distribute other weed-killing liquids.

The embodiment of the invention so far described may be merchandized as an unassembled kit consisting of: (1) the tank 34 and its auxiliary parts including cover, float, and valve; (2) the straps 36 and the respective nuts and bolts for securing the same; (3) the flexible hose 42; (4) the proper number of sections of distributing tube 18 together with the end cap and proper number of couplings and two brackets 20; and (5) the proper number of shields or guards 30 in flat form with the strips 32 unbent. The user in assembling such kit will screw the valve 40 into place on the tank and clamp the tank on to the handle of the lawn-mower or other roller-equipped device. Then the brackets 20 will be bolted into place using the roller-supporting nuts and bolts. The sections of the tube 18 are then pushed through the holes in the brackets and connected by the coupling 26. The end cap 28 and the flexible hose 42 are then fitted on the respective ends of the tube 18. The end cap and flexible hose will cooperate with the brackets 20 to properly hold the tube 18 against undue longitudinal displacement. The flexible hose 42 is then slipped on the nipple of the valve 40. The shields 30 are then bent so that one section will rest on the roller and another section extend over the top of the distributing tube 18. They are put in place and the strips 30 manually formed around the tube 18 to hold such shields as so placed. The applicator is then in condition for filling with the desired liquid mixture.

In the event that a lawn-mower manufacturer should desire to furnish the applicator as a standard part of a lawn-mower it would be desirable both for the sake of appearance and the conservation of space and economy of manufacture to make the supply tank also function as the lawn-mower handle. Such a construction is illustrated in Figs. 5 and 6 wherein the tank consists of an elongated hollow member 54 the ends of which have metal plugs 56 and 58 to close the tank and to provide support for the yokes 60 and the manual grip 62. The plug 56 is provided with a valve seat 64 in an outlet 66 leading to a nipple 68. The upper plug 58 has a filling inlet 72 closed by a cap 70. A valve 74 guided in the seat 64 is connected to a rod 76 which extends out through a bore 78 in the plug 58. To the outer end of such rod is secured a knurled screw 80 threadably mounted in a counterbore 82 in such cap. Rotation of the knurled screw 80 closes and adjustably opens the valve 74. It is desirable to provide a window 83 at the lower end of the tank through which liquid in the tank may be seen so that the user can see when the tank is nearly empty.

The tank shown in Figs. 1 and 7 is made of sheet metal. However, the modified supply tank shown in Figs. 8 to 11, inclusive, has a glass body 84 with a metal end 86 screwed thereon. The end 86 is preferably a die cast part and has an outlet and a lower nipple for receiving the flexible tube 42 and an upper exteriorly threaded neck 88. A closure cap 90 is threaded on such neck. A control valve 92 carried on a stem 94 seats over the outlet in the end 86 and is held normally closed by a compression spring 96 acting between such valve and a washer 98 seated on a shoulder at the bottom of the neck 88. The valve is opened by moving the stem 94 upwardly against the tension in spring 96. In the modification shown in Figs. 8 and 9 this is accomplished by a flexible chain 100 which may be moved upwardly in a wide portion of a slot 102 in the cover 90 and locked up by sliding the chain into a narrow portion of such slot as is well known to those skilled in such art. In the modification shown in Figs. 10 and 11 the valve 92 is opened by raising a rod 104 connected to the stem 94. Such upward motion may be controlled by a lever 106 which has a camming action, upon rotation thereof, causing the rod 104 to have upward longitudinal movement. Various types of camming action levers may be used. The one shown is mounted on the handle grip by a bracket 108 and the slope of such bracket or a threaded part between the rod 104 and the bracket 108 may be used to provide the camming action.

In distributing a liquid used for fertilizing, it is important to have a uniform flow to prevent under concentration of the liquid at any one spot. The applicator herein described controls the flow of the liquid fertilizer with the same accuracy that it controls the flow of weed-killing liquid. Because the liquid fertilizer is applied between the cutter and the place where the grass clippings fall on the surface of the lawn it is protected from undue evaporation and thus has greater efficiency.

Although only several embodiments of the invention are shown and described herein, it will be understood that this application is intended to cover such other changes or modifications as come within the spirit of the invention or scope of the following claims.

I claim:

1. An applicator for liquid for killing weeds mingled with grass including a member movable along the ground, grass cutting means on said member to throw grass clippings upwardly and outwardly of said means in an arcuate path, a ground engaging roller connected with said member for movement along the ground therewith, said roller being positioned below said arcuate path to contact the area cut by said cutting means while said area remains uncovered by said clippings, a distribution tube for liquid for killing weeds carried by said member and positioned directly over said roller and between said roller and said arcuate path, said tube having a plurality of outlets from which liquid for killing weeds drops in non-spray form onto said roller to form a film of liquid for killing weeds on said roller free from grass clippings in said arcuate path, a source of supply of liquid for killing weeds carried by said member and connected to said tube, and means for controlling the flow of said liquid from said source to said tube.

2. An applicator as claimed in claim 1 in which said distributing tube has three longitudinally extending rows of said outlets placed at angularly equally spaced stations about the circumference of said tube whereby said tube may be assembled without inspection and at least one row of said outlets will be at the lower side of the tube.

3. An applicator as claimed in claim 1 in which a shield extends longitudinally of and is mounted on said tube and extends from above said tube downwardly to the forward side of said roller to prevent grass clippings from lodging on said tube and affecting flow from said outlets and also to spread the liquid uniformly over said roller.

References Cited in the file of this patent

UNITED STATES PATENTS

| Number | Name | Date |
|---|---|---|
| 826,897 | Shely | July 24, 1906 |
| 1,804,230 | Raife | May 5, 1931 |
| 1,891,854 | Wade | Dec. 20, 1932 |
| 2,044,884 | Keller | June 23, 1936 |
| 2,176,175 | George | Oct. 17, 1939 |
| 2,551,096 | Chittick | May 1, 1951 |
| 2,605,587 | Wester | Aug. 5, 1952 |

FOREIGN PATENTS

| Number | Country | Date |
|---|---|---|
| 114,164 | Australia | Nov. 13, 1941 |
| 5,036 | Great Britain | of 1912 |
| 338,163 | Great Britain | Nov. 12, 1930 |

OTHER REFERENCES

Popular Science Monthly, September 1949, vol. 155, No. 3, p. 92.